(12) United States Patent
Allen et al.

(10) Patent No.: US 10,642,994 B1
(45) Date of Patent: May 5, 2020

(54) PROBABILISTIC DATA STRUCTURES FOR CONCORDANCE MANAGEMENT

(71) Applicant: Amazon Technologies, Inc., Seattle, WA (US)

(72) Inventors: Nicholas Alexander Allen, Kirkland, WA (US); Peter Zachary Bowen, Bainbridge Island, WA (US); Matthew John Campagna, Bainbridge Island, WA (US); Gregory Alan Rubin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 240 days.

(21) Appl. No.: 15/604,509

(22) Filed: May 24, 2017

(51) Int. Cl.
| | |
|---|---|
| *G06F 21/62* | (2013.01) |
| *H04L 29/06* | (2006.01) |
| *H04L 9/08* | (2006.01) |
| *G06F 16/93* | (2019.01) |
| *G06F 16/245* | (2019.01) |
| *G06F 16/22* | (2019.01) |
| *G06F 16/9535* | (2019.01) |

(52) U.S. Cl.
CPC ...... *G06F 21/6227* (2013.01); *G06F 16/2246* (2019.01); *G06F 16/245* (2019.01); *G06F 16/93* (2019.01); *G06F 16/9535* (2019.01); *G06F 21/6245* (2013.01); *H04L 9/0861* (2013.01); *H04L 63/0428* (2013.01); *H04L 63/123* (2013.01)

(58) Field of Classification Search
CPC .......................... G06F 21/6227; G06F 16/953
See application file for complete search history.

(56) References Cited

U.S. PATENT DOCUMENTS

| | | | |
|---|---|---|---|
| 8,498,995 B1 * | 7/2013 | Gond ................... | G06F 16/245 707/754 |
| 2014/0143549 A1 * | 5/2014 | Araki ................... | H04L 9/3242 713/175 |

* cited by examiner

*Primary Examiner* — Dao Q Ho
(74) *Attorney, Agent, or Firm* — Davis Wright Tremaine LLP

(57) ABSTRACT

A concordance service receives a probabilistic data structure query generated based at least in part on a set of query parameters for a search of a plurality of resources. In response to receiving the query, the concordance service uses the probabilistic data structure query and a probabilistic data structure tree to determine a set of nodes of the tree that individually satisfy the set of query parameters. The concordance service verifies that the resources corresponding to the set of nodes satisfy the query parameters. Based at least in part on this verification, the concordance service provides a response to the query.

18 Claims, 9 Drawing Sheets

PROBABILISTIC DATA STRUCTURES FOR CONCORDANCE MANAGEMENT

BACKGROUND

Document management services and other services often utilize concordances provide an index of terms and phrases specified in documents and other resources provided by these services. For instance, in response to a user request to identify documents that include certain terms and phrases, a document management service may evaluate the concordance to identify any documents that satisfy the request. However, using concordances to index terms and phrases in documents and other resources present various issues. For instance, it can be complex and resource-intensive to prevent use of a concordance from revealing sensitive information inadvertently to entities not authorized to access certain documents or other resources provided by these services.

BRIEF DESCRIPTION OF THE DRAWINGS

Various techniques will be described with reference to the drawings, in which.

DETAILED DESCRIPTION

Figure 1:
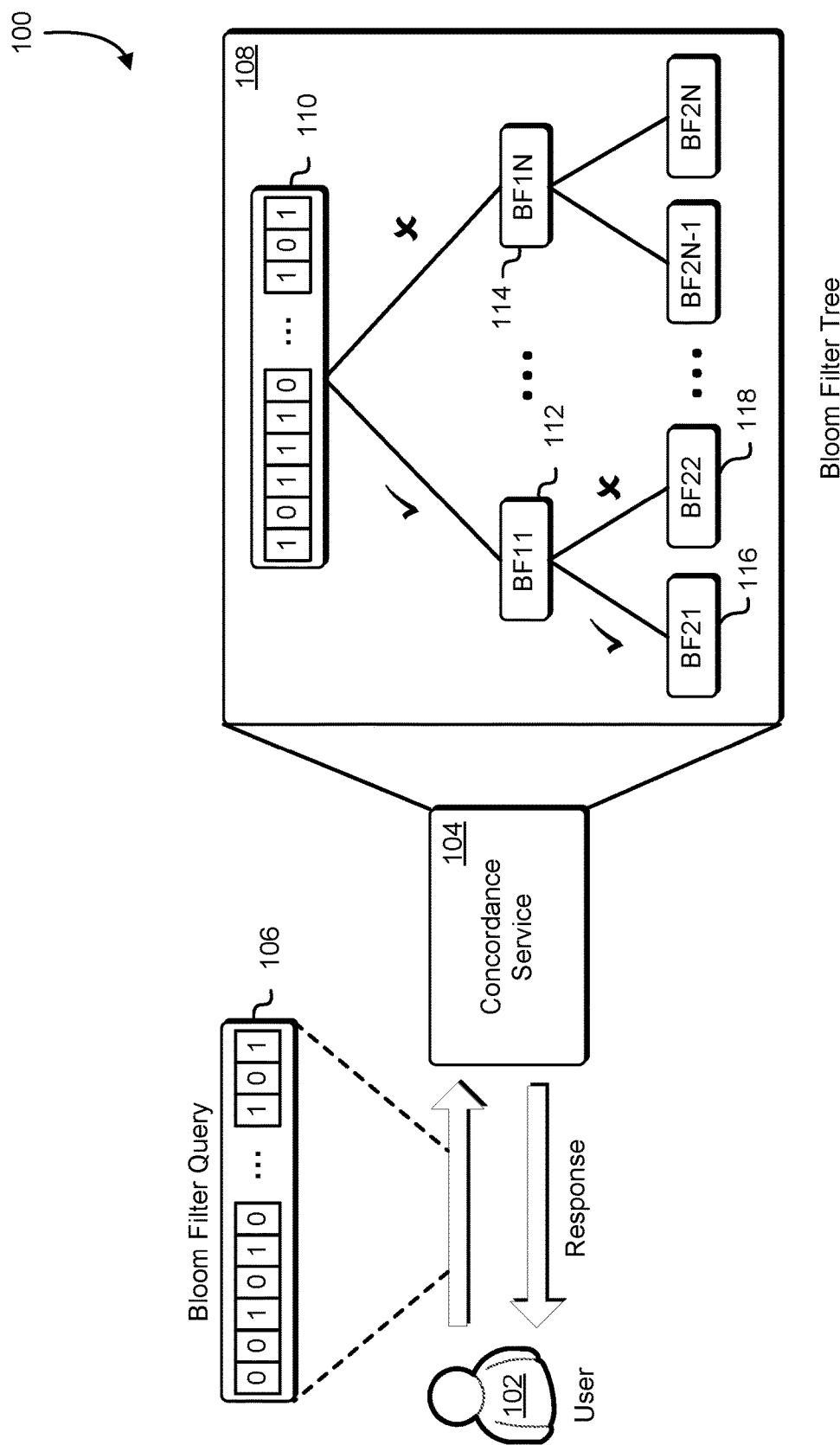
FIG. 1 shows an illustrative example of an environment in which various embodiments can be implemented.

This patent disclosure relates to the use of Bloom filter trees as a secure concordance for documents or other resources provided by a service. In an example, a document management service generates, for each document maintained by the document management service, a Bloom filter. The document management service may use significant terms of a document to generate a bloom filter for the document. Using the various Bloom filters for the documents provided by the document management service, the document management service may generate a Bloom filter tree that can be used as a concordance for the documents made available by the document management service. For instance, the leaves of the Bloom filter tree, which may correspond to individual documents provided by the document management service, may be combined via a bitwise OR operation to generate a parent node of the leaves. Nodes at a level of the tree may be combined through a bitwise OR operation to generate parent nodes. This process may continue until a root node is generated that corresponds to the terms specified in the set of documents made available by the document management service. The document management service may provide the Bloom filter tree to a concordance service, which may process incoming requests from users to identify documents that satisfy a query.

In some examples, the concordance service receives a Bloom filter query to identify any documents that satisfy the query. The Bloom filter query may include a Bloom filter generated by the user. This Bloom filter may have the same structure to the Bloom filters of the Bloom filter tree, having the same length as the Bloom filters in the Bloom filter tree and bits set using the same hash functions utilized by the document management service to set the bits of the Bloom filters in the Bloom filter tree. For instance, a user may input each search term into an entry function and hash the output of this entry function. The hash result may be used by the user to set bits from the Bloom filter query to one. In an example, the concordance service maintains a Bloom filter tree for each user. For instance, the document management service may generate a user-specific Bloom filter tree that includes terms specified in the documents provided by the document management service that the user is authorized to search for. Thus, if the user provides a Bloom filter query that included a prohibited term, the concordance service may evaluate the Bloom filter tree for the user and determine that no document provided by the document management service includes the prohibited term.

To query the Bloom filter tree using the Bloom filter query from the user, the concordance service may perform a bitwise AND or a bitwise OR operation using the Bloom filter query and the root node of the Bloom filter tree to determine whether the terms in the Bloom filter query are present in the documents. If so, the concordance service may select the next child nodes of the Bloom filter tree and repeat the bitwise AND or bitwise OR operation. This may continue until the concordance identifies any leaf nodes of the Bloom filter tree that include the terms included in the Bloom filter query.

The concordance service, in response to having identified any leaf nodes of the Bloom filter tree that include the search terms included in the Bloom filter query, may evaluate metadata corresponding to the identified leaf nodes to obtain document identifiers for the documents that include the search terms. In an example, the concordance service transmits the document identifiers identified as a result of the query and an encrypted document, provided by the user, which includes the plaintext terms used by the user to generate the Bloom filter query to the document management service. The document management service may decrypt the encrypted document provided by the user to obtain the plaintext search terms. Further, the document management service may access each document corresponding to the document identifiers to determine whether the plaintext search terms are specified in the documents. The document management service may modify the results of the query to include the document identifiers corresponding to the documents the document management service has verified include the user's search terms (e.g., by excluding documents identified through a false-positive caused by the Bloom filter's probabilistic nature). The document management service may provide the updated query results to the concordance service, which may provide the updated query results to the user. In some examples, the document management service can provide the documents to the concordance service for delivery to the user or can provide the documents to the user directly.

In some examples, the document management service provides cryptographic material to the concordance service in response to its request to verify the query results generated in response to the Bloom filter query provided by the user. The cryptographic material may be used by a client device of the user to decrypt the documents that include the search terms included in the Bloom filter query. The user may access the document management service to obtain the encrypted documents specified in the query results from the concordance service. Further, the user may utilize the cryptographic material to decrypt the encrypted documents for its use. In some instances, the document management service may provide the encrypted documents to the concordance service without the cryptographic material in response to the verification request. The document management service may rely on the user to have the cryptographic materials needed to decrypt the encrypted documents. Thus, if the user does not have the cryptographic materials, it may not be able to decrypt the encrypted documents.

In this manner, the document management service may generate a concordance for a variety of documents using a Bloom filter tree and may provide the Bloom filter tree to a concordance service to provide users with the ability to identify documents that include their search terms. In addition, the techniques described and suggested herein facilitate additional technical advantages. For instance, because the document management service is used to verify the query results from the concordance service, the document management service may identify any false positive results and provide an accurate search result without processing each document provided by the document management service. Further, the document management service may utilize the query results to identify any documents that the user may not be authorized to access and remove these from the query results provided to the user. Additionally, because the concordance service is provided by a Bloom filter tree corresponding to the terms specified in the documents maintained by the document management service, the concordance service is not exposed to the plaintext terms specified in the documents provided by the document management service. This may reduce the risk of sensitive terms and information associated with the documents of the document management service being discovered by unauthorized entities.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a user 102 submits a request to a concordance service 104 to identify one or more documents, maintained by a document management service, that include particular terms, phrases, or characteristics (e.g., particular terms separated by a specified number of other terms, particular terms specified a set number of times, etc.). The user 102 may be a customer of a document management service that maintains one or more documents that the user 102 may access for its needs. In some instances, the user 102 may be authorized to access certain documents provided by the document management service while being prohibited from accessing other documents. The concordance service 104 may comprise one or more computer systems that maintain one or more Bloom filter trees 108 on behalf of the document management service. In an embodiment, the concordance service 104 maintains a Bloom filter tree 108 for each user 102 authorized by the document management service to access at least one document provided by the document management service. In an alternative embodiment, the concordance service 104 maintains a Bloom filter tree 108 that is applicable for all users and is usable for queries submitted by these users.

In an embodiment, the document management service provides the one or more Bloom filter trees 108 to the concordance service 104 for use in identifying documents that satisfy user queries. To generate a Bloom filter tree 108 usable as a concordance for documents maintained by the document management service, the document management service may generate a Bloom filter for each document made available by the service. For instance, the document management service may identify each unique term, phrase, image, sound element, and other characteristic of a particular document and use these, along with a desired false positive error rate, to determine the length of the Bloom filter and the number of hash functions to be used to identify the bits to be set within the Bloom filter for the document. The document management service may ignore insignificant terms or characteristics, such as articles, pronouns, and the like that may be common and are likely to appear in most documents. Each document maintained by the document management service may be used to generate a leaf, or leaf node, of the Bloom filter tree 108. In some embodiments, the document management service generates a leaf that corresponds to a concordance for a subset of documents provided by the document management service. It should be noted that while documents are used extensively throughout the present disclosure as being the basis for the leaf nodes of the Bloom filter tree 108, leaf nodes may be generated for other units of content, such as collections of documents, sections of documents, units of content not classified as documents, and the like.

The document management service may perform a bitwise OR operation for two or more of the leaves, or leaf nodes, to generate a parent Bloom filter that can be used as a concordance for the subset of documents and/or concordances for subsets of documents. The document management service may continue to perform bitwise OR operations for the parent nodes of the Bloom filter tree 108 until the root node 110 of the Bloom filter tree 108 is generated. The root node 110 of the Bloom filter tree 108 may include a Bloom filter that serves as the concordance for all documents provided by the document management service. In some embodiments, the document management service inserts one or more junk bits into each Bloom filter of the Bloom filter tree 108 to prevent users or the concordance service 104 from discerning the contents of documents provided by the document management service through use of repeated queries to the concordance service 104. It should be noted that while the Bloom filter tree 108 illustrated in FIG. 1 is a binary tree, whereby each parent node has two child nodes, the Bloom filter tree 108 may be an n-ary tree, where each parent node may have any number of child nodes. Further, the Bloom filter tree 108 need not be uniform in the organization of the leaf nodes.

In its request to the concordance service 104 to identify one or more documents that have the terms, phrases, or other characteristics which the user 102 desires, the user 102 may include a Bloom filter query 106. The Bloom filter query 106 may comprise a Bloom filter constructed using the same techniques utilized by the document management service to generate the Bloom filters that make up the nodes of the Bloom filter tree 108. For instance, the user 102 may generate a Bloom filter that has the same length as the Bloom filters that make up the nodes of the Bloom filter tree 108. Additionally, the user 102 may utilize the hash functions utilized by the document management service to set one or more bits of the Bloom filter from zero to one. The Bloom filter query 106 may correspond to the terms, phrases, and other characteristics that the user 102 is searching for within the documents maintained by the document management service. For instance, if the user 102 wants to identify any documents that include the term "defenestration," the user 102 may input this term into an entry function and hash the output of the entry function to identify the bits within the Bloom filter that are to be set from zero to one. In some examples, the user 102, through a computing device utilized to generate the Bloom filter query 106, identifies one or more roots of a particular search term and use these roots to further identify other bits of the Bloom filter query that are to be set from zero to one. For instance, if the user 102 wants to search for the term "defenestration," the user's computing device may identify the root of the search term, in this case "defenestrate" and derive any other terms that utilized this root (e.g., defenestrated, defenestrating, etc.). These additional terms may be added to the Bloom filter query 106.

In some embodiments, the user 102 utilizes a cryptographic key provided by the document management service as input, along with each term, phrase, or characteristic that the user 102 is searching for, into a cryptographic hash function (e.g., keyed-hash message authentication code (HMAC), etc.) to obtain an output. This output may be hashed further to identify the bits of the Bloom filter query 106 that are to be set from zero to one. If the user 102 does not have the cryptographic key, it may be unable to query the Bloom filter tree 108 as it would be unable to generate a Bloom filter query 106 to correspond to the terms, phrases, and characteristics that the user 102 wishes to identify from the documents provided by the document management service. The Bloom filter tree 108 may similarly be generated by using the cryptographic hash function and other hash functions to set the bits of the various Bloom filters that comprise the Bloom filter tree 108. In some embodiments, the cryptographic key is a symmetric cryptographic key generated by the document management service and provided to the user 102. In other embodiments, the cryptographic key is available to users authorized to access documents for which Bloom filters are generated using the cryptographic key. It should be noted that the cryptographic key may also be maintained by another entity other than the document management service, such as a central server accessible by users authorized to obtain the cryptographic key or by the users themselves.

In some instances, the user 102 may provide the search parameters to be included in the Bloom filter query 106 to the document management service or to another service authorized to utilize the one or more hash functions to generate the Bloom filter query 106. The document management service or other service may perform similar operations to the ones described above to generate the Bloom filter query 106 for the user 102, and may provide the Bloom filter query 106 to the user. This may prevent the user 102 from generating myriad Bloom filter queries or from being exposed to the hash functions used to generate the Bloom filter query 106. The user 102 may submit the provided Bloom filter query 106 to the concordance service 104 for processing.

The user 102 provides its Bloom filter query 106 to the concordance service 104, which may evaluate the Bloom filter of the Bloom filter query 104 against the various nodes of the Bloom filter tree 108 to identify the one or more documents that satisfy the Bloom filter query 106. For example, in response to receiving the Bloom filter query 106 from the user 102, the concordance service 104 may perform a bitwise AND operation using the Bloom filter query 106 and the root node 110 of the Bloom filter tree 108. If the output of the bitwise AND operation is not identical to the Bloom filter query 106, this may indicate that no documents maintained by the document management service have the characteristics corresponding to the user's 102 search query. If this occurs, the concordance 104 may terminate its operations using the Bloom filter tree 108 and provide a response to the user 102 indicating that no documents satisfy its query. Alternatively, the concordance service 104 may perform a bitwise OR operation using the Bloom filter query 106 and the root node 110 of the Bloom filter tree 108. If the output of the bitwise OR operation is not identical to the Bloom filter of the root node 110, this may also indicate that no documents maintained by the document management service have the characteristics corresponding to the user's 102 search query.

If the concordance service 104 determines that the root node 110 includes the elements of the user's Bloom filter query 106, the concordance service may select the successor nodes 112, 114 (e.g., next set of parent nodes) of the Bloom filter tree 108 and perform a bitwise AND or bitwise OR operation, as described above, between the Bloom filter query 106 and each of the successor nodes 112, 114. As illustrated in FIG. 1, the elements of the Bloom filter query 106 are present within successor node 112 but not within successor node 114. As a result, the concordance service 104 may discontinue following the branches stemming from successor node 114 and, instead, continue following the branches of successor node 112 to identify the child nodes 116, 118 of the successor node 112. The concordance service 104 may perform another bitwise AND or bitwise OR operation using the Bloom filter query 106 and each of the child nodes 116, 118 to determine whether any of the child nodes 116, 118 satisfy the Bloom filter query 106. For example, as illustrated in FIG. 1, child node 116 satisfies the Bloom filter query 106 while child node 118 does not.

If the concordance service 104 identifies one or more child nodes that satisfy the Bloom filter query 106, the concordance service 104 may evaluate the metadata associated with each of these child nodes to identify a document identifier corresponding to a document, maintained by the document management service, which includes the characteristics used to generate the Bloom filter query 106. In an embodiment, the concordance service 104 provides the identified document identifiers to the user 102 to fulfill the user's request. The user 102, in response to receiving the document identifiers from the concordance service 104, may transmit a request to the document management service to obtain the one or more documents corresponding to these identifiers. In some embodiments, if the user 102 utilized a cryptographic key as input to a cryptographic hash function for generation of the Bloom filter query 106, the user 102 can utilize the cryptographic key to encrypt the plaintext search parameters. The user 102 may provide the encrypted search parameters and the document identifiers to the document management service, which may use its cryptographic key to decrypt the encrypted search terms. Further, the document management service may evaluate the identified documents to determine whether these documents satisfy the search parameters provided by the user 102. If so, the document management service may provide the identified documents to the user 102. In some instances, the document management service may determine whether the user 102 is authorized to access the documents corresponding to the document identifiers provided by the user 102. If the user 102 is not authorized to access one or more documents corresponding to the document identifiers provided, the document management service may deny the user 102 access to these documents.

In some embodiments, in addition to the Bloom filter query 106, the user 102 provides an encrypted document that specifies the search parameters that were used to generate the Bloom filter query 106. The encrypted document may be created using a cryptographic key provided by the document management service to be used as input, along with each search parameter, into a cryptographic hash function for identifying the bits of the Bloom filter query 106 that are to be set from zero to one. The concordance service 104 may provide the encrypted document and the document identifiers obtained through use of the Bloom filter query 106 and the Bloom filter tree 108 to the document management service. The document management service may use its cryptographic key to decrypt the encrypted document and to obtain the search parameters used by the user 102 to generate the Bloom filter query 106. The document management service may evaluate the documents corresponding to the document identifiers provided by the concordance service 104 to determine whether these documents satisfy the user's search parameters. The document management service may eliminate any document identifiers corresponding to documents that do not satisfy the user's search parameters (e.g., false positives resulting from analyses of the Bloom filters of the Bloom filter tree 108), as well as any document identifiers corresponding to documents that the user 102 is not authorized to access.

The document management service may provide the concordance service 104 with an updated query result specifying the document identifiers of the documents that satisfy the Bloom filter query 106 provided by the user 102. In some instances, the document management service may provide the identified documents to the concordance service 104 for delivery to the user 102. In an embodiment, the document management service utilizes the cryptographic key to encrypt the identified documents and provide the encrypted documents to the concordance service 104. Thus, the concordance service 104 may be unable to evaluate the encrypted documents, but may instead provide these encrypted documents to the user 102, which may utilize its cryptographic key to decrypt the encrypted documents.

In some embodiments, the concordance service 104 enforces one or more rules that are to be satisfied in order to evaluate the Bloom filter query 106 against the Bloom filter tree 108. For instance, the concordance service 104 may require Bloom filter queries to have a minimum density (e.g., minimum number of bits set from zero to one) in order to be utilized for identifying documents that can satisfy a query. Additionally, the concordance service 104 may impose a rule defining a bit minimum for Bloom filter queries to prevent users from using trivial terms (e.g., articles, pronouns, etc.) to identify and obtain myriad documents provided by the document management service.

It should be noted that while Bloom filters and Bloom filter trees are used extensively throughout the present disclosure for illustrative purposes, other probabilistic data structures and probabilistic data structure trees may be used. A probabilistic data structure, in an embodiment, is a data structure configured such that, when maintained correctly, a query against the data structure (e.g., to determine whether an element is in a set) has a non-zero probability of being incorrect (e.g., due to a hash collision). For instance, in some embodiments, a probabilistic data structure is configured such that the probability of a false positive is below a specified threshold to balance the computational efficiency provided by the data structure with the inconvenience caused by security actions that are unnecessarily performed as a result of a false positive. Other techniques to mitigate against false positives, such as by reference to a database only when a violation is potentially detected, may be used such that additional computing resources are used to make sure there was a violation only when the potential of a violation having occurred has been detected.

Figure 2:
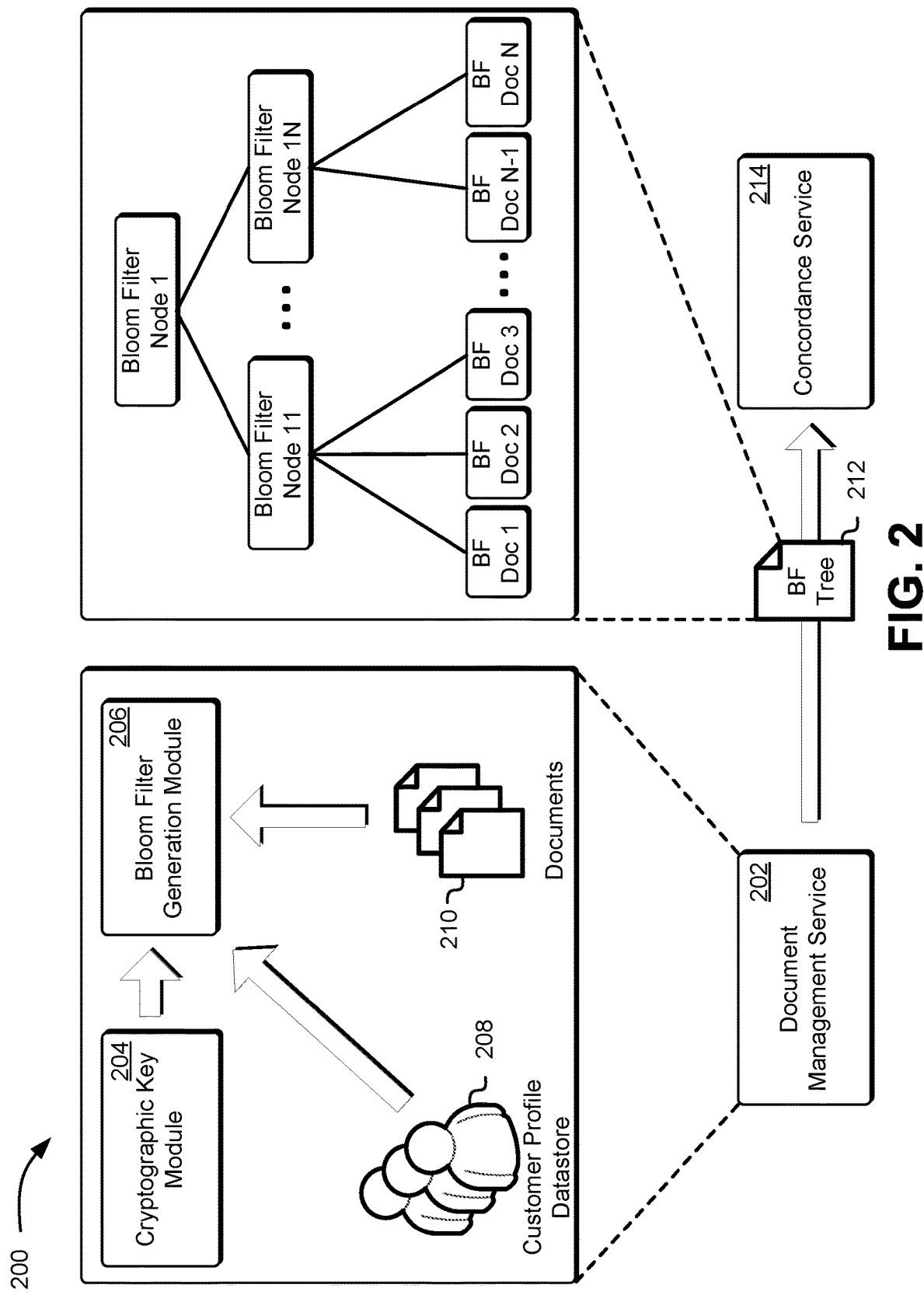
FIG. 2 shows an illustrative example of an environment in which a document management service generates and provides a Bloom filter tree usable to identify one or more documents of the document management service in response to Bloom filter queries from users in accordance with at least one embodiment.

As noted above, a document management service may generate a concordance for a set of documents using a Bloom filter tree. Each leaf of the Bloom filter tree may correspond to a particular document or to a concordance for a subset of documents. Further, each parent node of the Bloom filter tree may serve as a concordance for each of its child nodes, which may themselves be parent nodes for leaf nodes of the Bloom filter tree. The document management service may provide the Bloom filter tree to a concordance service, which may utilize the Bloom filter tree to process incoming Bloom filter queries to identify documents maintained by the document management service that have terms, phrases, or characteristics included in the Bloom filter query. Accordingly, FIG. 2 shows an illustrative example of an environment 200 in which a document management service 202 generates and provides a Bloom filter tree 212 usable to identify one or more documents 210 of the document management service 202 in response to Bloom filter queries from users in accordance with at least one embodiment.

In the environment 200, the document management service 202, using a Bloom filter generation module 206, generates a Bloom filter tree 212 that may serve as a concordance for one or more documents 210 maintained by the document management service 202. The Bloom filter generation module 206 may include one or more computer systems, applications, or processes of the document management service 202 that evaluate the myriad documents 210 maintained by the document management service 202 to identify the terms, phrases, and other characteristics of each document. The Bloom filter generation module 206 may generate, for each document, a Bloom filter. The Bloom filter may be generated by identifying the possible terms, phrases, and characteristics for documents 210 maintained by the document management service 202, as well as a desired false positive rate for the Bloom filter. In some embodiments, the Bloom filter for each document is generated with one or more junk bits, which may not correspond to any term, phrase, or characteristic of a document but may be used to prevent users or the concordance service 214 from being able to derive the characteristics of the documents 210 maintained by the document management service 202. These one or more junk bits may correspond to non-words (e.g., random characters, strings of characters, etc.).

The Bloom filter generation module 206, using the Bloom filter generated for each document maintained by the document management service 202, may generate the Bloom filter tree 212. In some instances, the Bloom filter generation module 206 may use a binary, ternary, or any other n-ary structure, whereby each vertex of the Bloom filter tree 212 has at most two, three, or n (where n is any positive integer) child nodes, respectively. The Bloom filter generation module 206 may use a bitwise OR operation to combine two or more Bloom filters to generate a parent node of the Bloom filter tree 212. For instance, if the Bloom filter generation module 206 generates a binary Bloom filter tree 212, the Bloom filter generation module 206 may perform a bitwise OR operation using the Bloom filters of two documents to generate a parent node that serves as a concordance for the two documents. As an illustrative example of a bitwise OR operation, if the Bloom filter of a first document is set to "110010" and the Bloom filter of a second document is set to "010111," the result of a bitwise OR operation using the two Bloom filters would be "110111." The Bloom filter generation module 206 may continue to generate parent nodes for the Bloom filter tree 212 until a root node is generated. The root node may serve as the concordance for the set of documents 210 maintained by the document management service 202. The Bloom filter generation module 206 may provide the Bloom filter tree 212 to the concordance service 214 for use in processing Bloom filter queries from users of the document management service 202.

In an embodiment, the Bloom filter generation module 206 generates a user-specific Bloom filter tree for each customer of the document management service 202. For instance, the Bloom filter generation module 206 may access a customer profile datastore 208 to identify a profile for a particular customer. The profile may specify the documents maintained by the document management service 202 that the customer is authorized to access. Further, the customer's profile may specify the key terms, phrases, or characteristics of the documents 210 that the customer is authorized to query for. For instance, a customer may be authorized to query specific terms and phrases, while being denied permission to query for certain characteristics of the documents 210. This may result in the Bloom filter generation module 206 generate alternative Bloom filters for each of the documents 210 maintained by the document management service 202. Further, the Bloom filter tree for the customer may include fewer leaf nodes, as the Bloom filter generation module 206 may forego creating a Bloom filter for documents that the customer is not authorized to access. In some instances, the customer may specify, in its profile, the size of the Bloom filter to be used for each document that it has access to. The size specified in the customer's profile may satisfy one or more criteria such that the size of the Bloom filter comports with a false positive rate specified by the document management service 202 and has sufficient bits to accommodate the terms, phrases, and characteristics that the customer may query for. If the customer does not specify a desired Bloom filter size within its profile, the Bloom filter generation module 206 may utilize a default Bloom filter size for each Bloom filter generated for the customer's Bloom filter tree.

In some embodiments, the Bloom filter generation module 206 utilizes one or more cryptographic hash functions to determine the bits to be set within each Bloom filter of a Bloom filter tree 212. The cryptographic key utilized for each term, phrase, or characteristic of a document may be provided to customers authorized to access the document and to query for such term, phrase, or characteristic of the document. Thus, in order for the customer to generate a valid Bloom filter query that can be provided to the concordance service 214 for identifying documents that satisfy the query, the customer may need to utilize the cryptographic key as input into one or more cryptographic hash functions to identify the bits to be set within the Bloom filter query. If the customer does not have the cryptographic key, the Bloom filter query may not be usable to identify the correct documents that comprise the customer's desired terms, phrases, or characteristics.

If one or more documents are encrypted by the document management service 202, requiring a cryptographic key for decryption, the document management service 202, via a cryptographic key module 204, may provide a cryptographic key identifier to the customer. The cryptographic key module 204 may include one or more computer systems, applications, or processes of the document management service 202 that generate and maintain cryptographic keys for use by the document management service 202 to encrypt documents 210 and to generate the various Bloom filters of one or more Bloom filter trees. In some embodiments, the Bloom filter generation module 206 includes, in the Bloom filters of the Bloom filter tree 212, one or more bits corresponding to the cryptographic key identifier. For instance, the Bloom filter generation module 206 obtains, from the cryptographic key module 204, the cryptographic key utilized to encrypt one or more documents provided by the document management service 202 or provided to the customer for use as input to a cryptographic hash function used to set the bits of the Bloom filter query and the Bloom filters of the Bloom filter tree 212.

If the customer is provided with the cryptographic key identifier corresponding to the cryptographic key by the cryptographic key module 204, the customer may use the cryptographic key identifier as input into an entry function to generate an output that can be used to identify the bits of the Bloom filter query that are to be set from zero to one. The Bloom filter generation module 206 may also set the bits corresponding to the cryptographic key identifier in the root node and all other nodes of the Bloom filter tree 212 from zero to one. Thus, if the customer does not have the cryptographic key identifier, the concordance service 214 may determine that no documents satisfy its query. In some embodiments, the Bloom filter generation module 206 sets the cryptographic key identifier bits to one for documents that require the cryptographic key for decryption. Thus, if the customer does not have the cryptographic key or the identifier for the cryptographic key, the concordance service 214 may identify documents that satisfy the Bloom filter query and that do not require use of the cryptographic key for decryption. It should be noted that while a cryptographic key identifier is used extensively throughout the present disclosure, other information may be used to denote user access to the cryptographic key. This may include using the cryptographic key itself as input to the entry function to identify the bits that are to be set for one within the Bloom filter query and the various Bloom filters of the Bloom filter tree 212. Generally, any attestation of access to the cryptographic key may be used.

In some instances, a Bloom filter tree 212 may be generated based at least in part on the hierarchical structure of the datastores utilized to maintain the documents 210. For instance, instead of using an n-ary structure, a Bloom filter tree 212 may be structured such that a parent node may correspond to a datastore that is used to store one or more documents that are represented by the children or leaves of the parent node. Thus, each parent node may have a different number of children or leaves, based at least in part on the documents that are part of the organization of the documents within the various datastores of the document management service 202.

Figure 3:
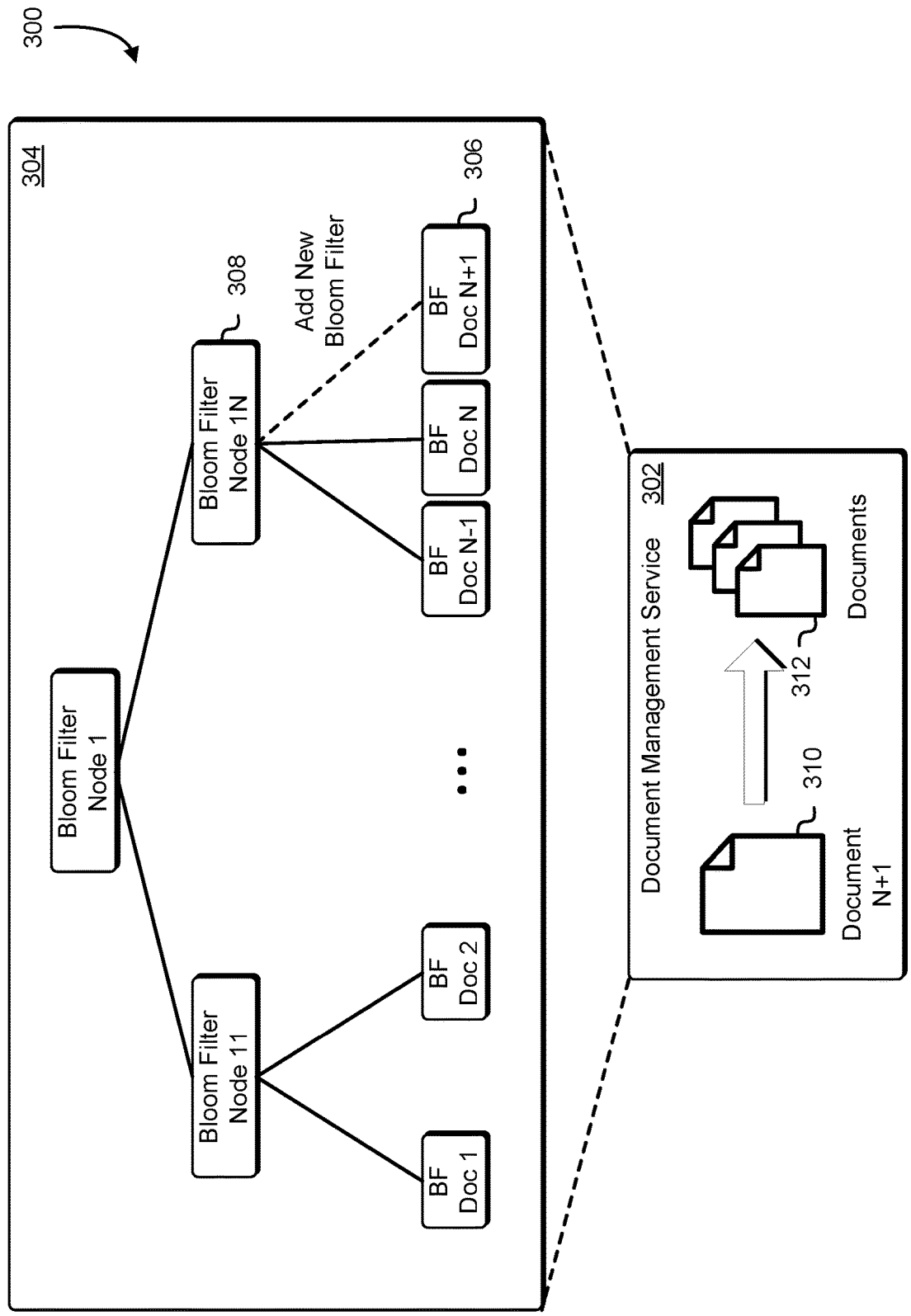
FIG. 3 shows an illustrative example of an environment in which a Bloom filter tree is updated by a document management service in response to identifying an additional document stored by the document management service in accordance with at least one embodiment.

As noted above, a document management service may maintain a Bloom filter tree for each customer of the document management service. Each Bloom filter tree may be have a binary, ternary, or other n-ary structure, whereby each parent node has two, three, or more children nodes, respectively. If a new document is added by the document management service and is made available to its customers, the document management service may update a Bloom filter tree by adding a new Bloom filter corresponding to the document as a child node to an existing parent node. As a result, the document management service may update all parent nodes of which the new child node is part, including the root node of the Bloom filter tree. Further, if the document management service maintains an n-ary structure for the Bloom filter, the document management service may asynchronously update the Bloom filter tree to achieve such a structure. Accordingly, FIG. 3 shows an illustrative example of an environment 300 in which a Bloom filter tree 304 is updated by a document management service 302 in response to identifying an additional document 310 stored by the document management service 302 in accordance with at least one embodiment.

In the environment 300, the document management service 302 adds a new document 310 to a documents datastore 312 maintained by the document management service 302. The new document 310 may be added by a customer of the document management service 302. Alternatively, the document management service 302 may add the new document 310 to the documents datastore 312 in response to a notification from another service indicating that a new document has been added to a compendium of existing documents. In some instances, the document management service 302 may receive, from another service or from a customer, a notification indicating the terms, phrases, and other characteristics of the new document 310, as well as an identifier corresponding to the new document 310.

In response to receiving the new document 310 or the notification specifying the characteristics of the new document 310, the document management service 302 may generate a Bloom filter 306 corresponding to the characteristics of the new document 310. For instance, the document management service 302 may identify the entry function and the various hash functions utilized to generate the existing Bloom filters of a Bloom filter tree 304. Using the identified entry function and hash functions, the document management service 302 may use the characteristics of the new document 310 to generate a Bloom filter 306 corresponding to the new document 310.

The document management service 302 may add the Bloom filter 306 corresponding to the new document 310 to an existing parent node 308 of the Bloom filter tree 304. For instance, the document management service 302 may perform a bitwise OR operation between the Bloom filter 306 corresponding to the new document 310 and the parent node 308 Bloom filter to update the parent node 308. Thus, the parent node 308 may be used to support queries regarding the characteristics of the new document 310. The document management service 302 may subsequently perform another bitwise OR operation involving the parent node 308 and other parent nodes at the same hierarchical vertex of the Bloom filter tree 304 to update the next level parent node. This may continue until the root node of the Bloom filter tree 304 is updated to incorporate the contents and characteristics of the new document 310.

In some instances, the addition of the Bloom filter 306 corresponding to the new document 310 may result in an unbalanced Bloom filter tree 304. For instance, if the Bloom filter tree 304 is constructed using an n-ary structure, where each parent node has at most n child nodes (e.g., leaves), the addition of the Bloom filter 306 may result in a parent node that has n+1 child nodes. In some embodiments, the document management service 302 provides the unbalanced Bloom filter tree to the concordance for its use in processing document queries. Additionally, the document management service 302 may rebalance the Bloom filter tree 304 if enough new documents are introduced to enable creation of a new parent node within the Bloom filter tree 304, thereby enabling each parent node to satisfy the requirements of the desired n-ary tree structure established by the document management service 302.

Figure 4:
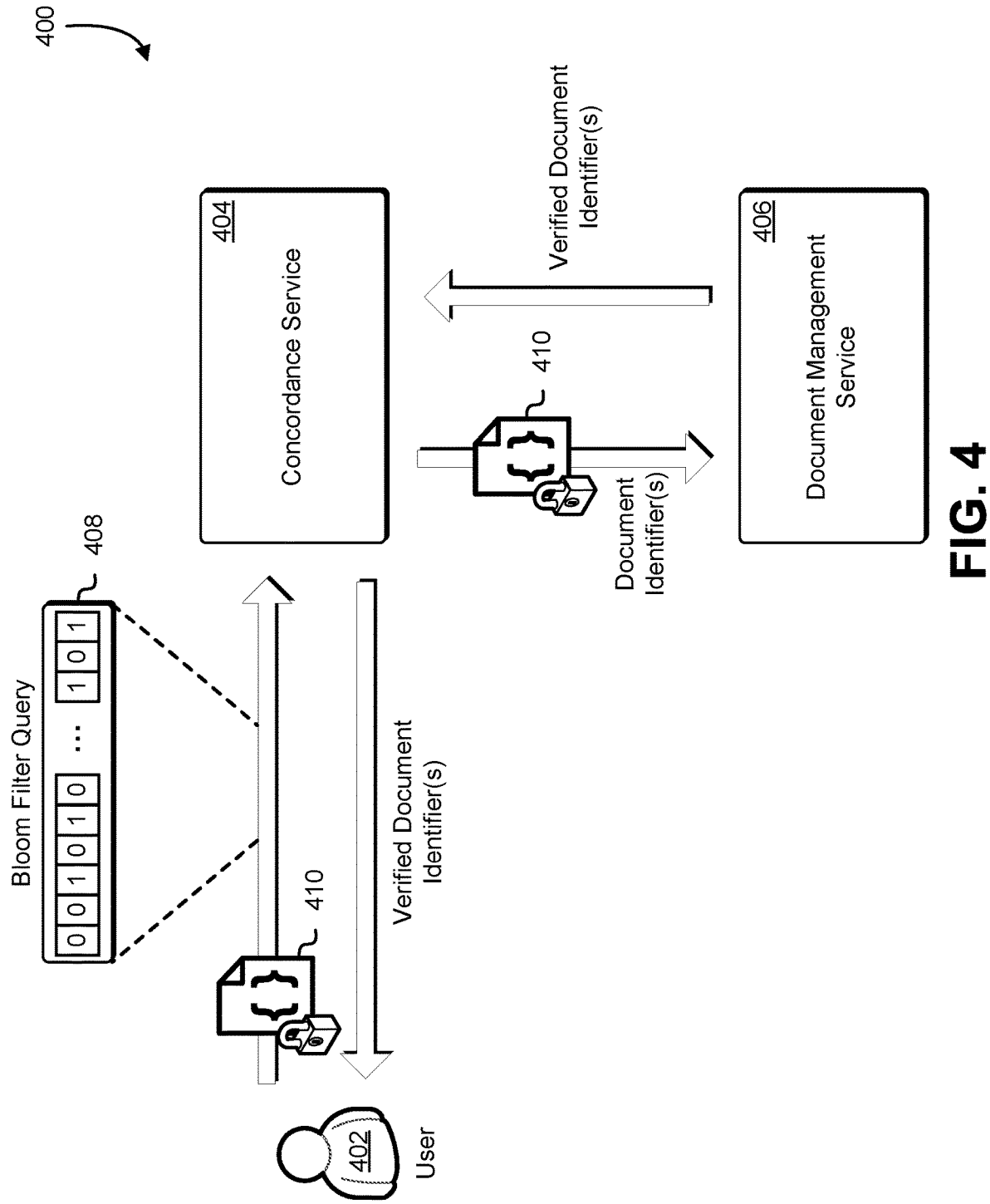
FIG. 4 shows an illustrative example of an environment in which a concordance service transmits a request to a document management service to verify a query result generated in response to a Bloom filter query from a user in accordance with at least one embodiment.

As noted above, a user may submit a Bloom filter query to a concordance service to identify one or more documents provided by a document management service that satisfy the query parameters inputted into the Bloom filter query. In some embodiments, the user provides, in addition to the Bloom filter query, the query parameters used to generate the Bloom filter query and that the user has specified in order to identify the one or more documents provided by the document management service. These query parameters may be encrypted using a cryptographic key or other shared secret maintained between the user and the document management service. If the concordance service identifies one or more documents that satisfy the Bloom filter query, the concordance service may provide identifiers corresponding to the identified one or more documents, as well as the encrypted query parameters to the document management service. In response to receiving the document identifiers and the encrypted query parameters, the document management service may verify that the documents identified by the concordance service do satisfy the user's query parameters. Accordingly, FIG. 4 shows an illustrative example of an environment 400 in which a concordance service 404 transmits a request to a document management service 406 to verify a query result generated in response to a Bloom filter query 408 from a user 402 in accordance with at least one embodiment.

In the environment 400, a user 402 submits a Bloom filter query 408 and encrypted query parameters 410 to a concordance service 404 to identify one or more documents that may satisfy the user's query parameters. The user 402 may be provided with the parameters of the Bloom filters utilized to generate the Bloom filter tree provided to the concordance service 404 to generate its Bloom filter query 408. For example, the user 402 may generate a Bloom filter query 408 that has the same size as the Bloom filters used to generate the Bloom filter tree and may utilize the hash functions utilized by the document management service 406 to set the bits of the Bloom filter query 408 corresponding to the query parameters. In some embodiments, the user 402 provides the query parameters to another service that may generate the Bloom filter query 408 on behalf of the user 402. This other service may provide the Bloom filter query 408 to the user 402.

In an embodiment, the user 402 utilizes a symmetric cryptographic key, provided by the document management service 406, to encrypt the query parameters. The document management service 406 may utilize this symmetric cryptographic key to decrypt the encrypted query parameters 410 and obtain the query parameters used to generate the Bloom filter query 408. In an alternative embodiment, the user 402 utilizes a public cryptographic key of a cryptographic key pair generated by the document management service 406 to encrypt the query parameters. The document management service 406 may maintain the private cryptographic key pair of the cryptographic key pair, which may be used to decrypt the encrypted query parameters 410. In some embodiments, the user 402 generates a symmetric cryptographic key (e.g., randomly) and encrypts the query parameters using the symmetric cryptographic key. The user 402 may use the public cryptographic key from the document management service 406 to encrypt the symmetric key. The user 402 may provide the encrypted symmetric key and the encrypted query parameters 410 to the document management service 406, which may use its private cryptographic key to obtain the user's symmetric cryptographic key for decrypting the encrypted query parameters 410.

In response to receiving the Bloom filter query 408 and the encrypted query parameters 410 from the user 402, the concordance service 404 may identify a Bloom filter tree that may be used to process the Bloom filter query 408. As described above, the document management service 406 may generate a Bloom filter tree for each customer or user of the document management service 406 based at least in part on the documents that the user is authorized to access, as well as any query parameters that the user is authorized to query for in the Bloom filter query 408. The document management service 406 may provide these personalized Bloom filter trees to the concordance service 404. Thus, in response to receiving the Bloom filter query 408 from the user 402, the concordance service 404 may use an identifier of the user 402 to identify the Bloom filter tree designated for use in processing queries from the user 402. In some instances, the concordance service 404 may utilize a generic (e.g., applicable to all users) Bloom filter tree for processing the Bloom filter query 408.

The concordance service 404 may perform a bitwise AND or a bitwise OR operation using the Bloom filter query 408 and the root node of the Bloom filter tree to determine whether the query parameters used to generate the Bloom filter query 408 are specified within any documents the user 402 is authorized to access. For instance, the concordance service 404 may perform a bitwise AND operation using the Bloom filter query 408 and the root node to determine whether the outcome is identical to the Bloom filter query 408. If the result is not identical to the Bloom filter query 408, the concordance service 404 may determine that no documents satisfy the query parameters specified by the user 402. As another example, the concordance service 404 may perform a bitwise OR operation using the Bloom filter query 408 and the root node to determine whether the outcome is identical to the root node. If the result is not identical to the root node, the concordance service 404 may determine that no documents satisfy the query parameters. It should be noted that the concordance service 404 may utilize one or more set functions (e.g., bitwise AND, bitwise OR, etc.) based at least in part on the query parameters. For instance, the concordance service 404 may perform various set functions if the query parameters are complex. For example, if a user 402 submits a request to identify any documents that satisfy a query requesting documents that include A and ((B or C) or (B and D)), the concordance 404 may parse these query parameters using one or more mathematical functions into individual queries that may be used to identify the one or more documents that satisfy the query parameters. The user 402 may specify these particular elements of the query to the concordance service 404 to enable the concordance service 404 to identify the operations to be performed using the Bloom filter query 408.

The concordance service 404 may perform the bitwise AND or the bitwise OR operation for the Bloom filter query 408 along the branches of the Bloom filter tree if it is determined that the root node satisfies the Bloom filter query 408. If, in following the branches of the Bloom filter tree, the concordance service 404 determines that a node does not satisfy the Bloom filter query 408, the concordance service 404 may omit following any branches stemming from this node, as no other child nodes stemming from this node will satisfy the Bloom filter query 408. The concordance service 404 may continue to follow branches stemming off of nodes that satisfy the Bloom filter query 408 until the concordance service 404 identifies one or more leaves of the Bloom filter tree that satisfy the Bloom filter query 408. These leaves may correspond to individual documents maintained by the document management service 406. Alternatively, the leaves may correspond to additional concordances, which may be used by the document management service 406 to identify the documents that satisfy the user's query parameters. Each leaf may specify, in metadata, a document or concordance identifier that may be used by the document management service 406 to retrieve the document or concordance usable to fulfill the query.

If the concordance service 404 identifies one or more documents or concordances that satisfy the Bloom filter query 408, the concordance service 404 may transmit the identifiers of the identified documents and concordances to the document management service 406 for verification. The concordance service 404 may further provide the encrypted query parameters 410 provided by the user 402. In some embodiments, the user 402 specifies, in its request to the concordance service 404, a cryptographic key identifier that the document management service 406 may use to identify the cryptographic key usable to decrypt the encrypted query parameters 410. Alternatively, the user 402 may specify the cryptographic key identifier in metadata of the encrypted query parameters 410.

The document management service 406 may decrypt the encrypted query parameters using the identified cryptographic key to obtain the query parameters utilized by the user 402 to generate the Bloom filter query 408. In some embodiments, to ensure that these were the query parameters used, the document management service 406 can use the query parameters to generate an expected Bloom filter query. If the expected Bloom filter query does not match the Bloom filter query 408, the document management service 406 may transmit a notification to the concordance service 404 to indicate that it is not to provide document identifiers to the user 402, as the request from the user 402 could not be authenticated. The document management service 406 may use the document identifiers or the concordance identifiers specified by the concordance service 404 to obtain the documents and concordances, respectively. The document management service 406 may use the user's query parameters and the obtained documents and concordances to determine whether the documents and concordances include the query parameters specified by the user 402. If any documents and concordances do not include the user's query parameters, the document management service 406 may determine that these are false positive results and remove these from further consideration.

In some embodiments, the document management service 406 evaluates the document and concordance identifiers to determine whether the user 402 is authorized to access the documents corresponding to the document identifiers or indexed using the identified concordances. If the user 402 is not authorized to access a document corresponding to a document identifier or indexed in a concordance corresponding to a concordance identifier, the document management service 406 may remove the document from a notification indicating verified document identifiers corresponding to documents that the user 402 may access. If the document management service 406 identifies any documents that the user 402 may access and that satisfy the user's query parameters, the document management service 406 may specify the document identifiers corresponding to these documents in a notification to the concordance service 404. The concordance service 404 may provide a response to the Bloom filter query 408 that specifies these document identifiers. Thus, the user 402 may access the document management service 406 to access the identified documents.

In an embodiment, the document management service 406 utilizes the cryptographic key used to decrypt the encrypted query parameters 410 to encrypt the one or more documents that satisfy the user's query parameters. The document management service 406 may provide the encrypted documents to the concordance service 404 in response to the verification request from the concordance service 404. The concordance service 404 may transmit the encrypted documents from the document management service 406 to the user 402 to fulfill the user's request. The user 402 may utilize its cryptographic key to decrypt the encrypted documents. In some instances, the document management service 406 may provide the document identifiers corresponding to the documents that satisfy the query parameters and cryptographic material usable to create an assertion of a cryptographic key usable to decrypt the documents. Thus, if the user 402 has established a trusted relationship with the document management service 406, the user 402 may use the cryptographic material to derive an assertion of a cryptographic key usable to decrypt the documents or to otherwise access the document management service 406 to obtain the documents.

Figure 5:
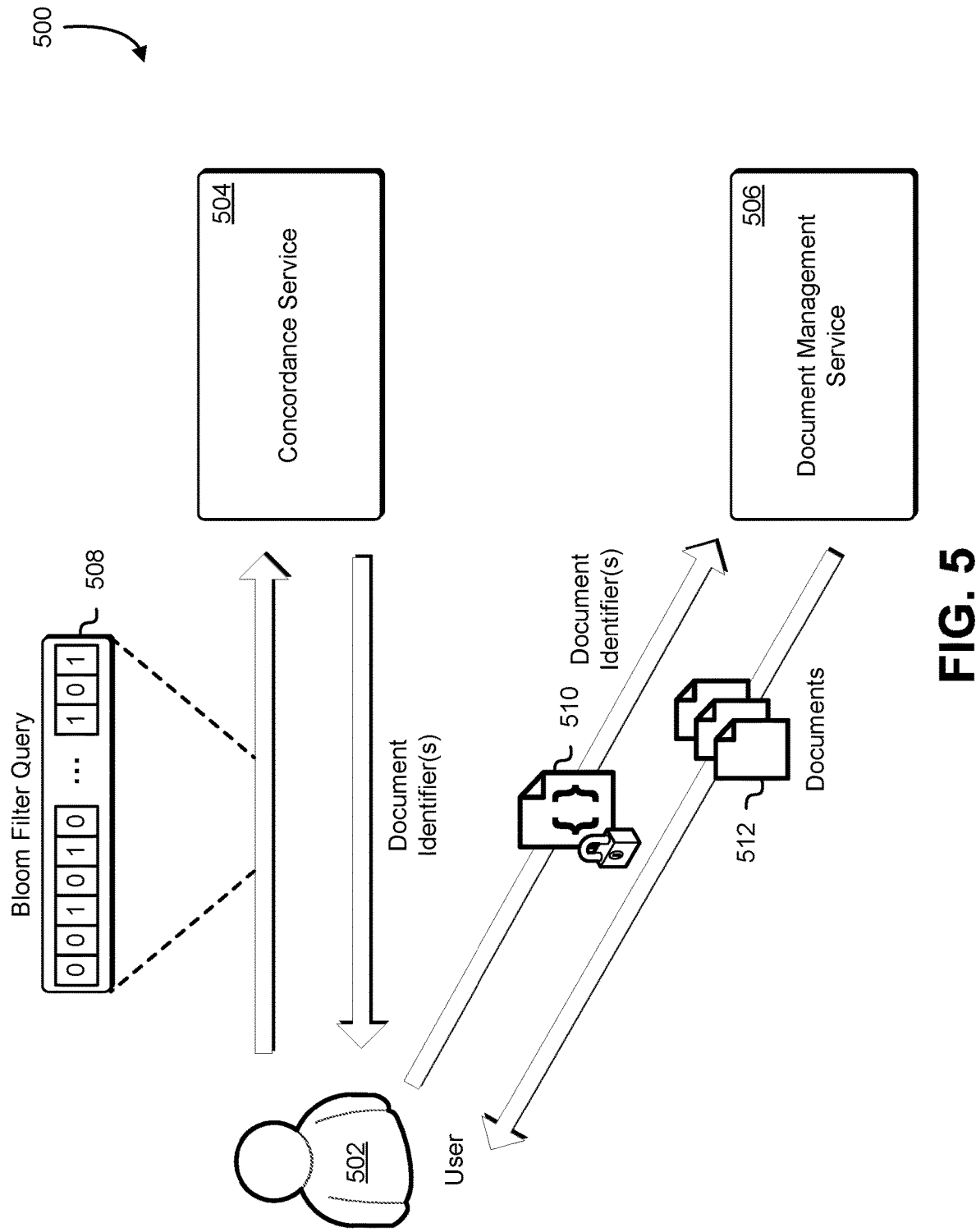
FIG. 5 shows an illustrative example of an environment in which a concordance service provides a query result to a user to enable the user to submit a request to a document management service to obtain one or more documents specified in the query result in accordance with at least one embodiment.

As noted above, the concordance service, in response to receiving a Bloom filter query from a user, may provide the user with one or more document and concordance identifiers that may correspond to documents and concordances, respectively, that may satisfy the user's query. The user, in response to receiving these identifiers, may transmit a request to the document management service to obtain the specified documents. Further, if the concordance service provided one or more concordance identifiers in response to the query, the user may submit a request to the document management service to determine whether there are any documents that satisfy the user's query parameters. This may cause the document management service to use the identified concordances to identify any documents that satisfy the user's query parameters. Accordingly, FIG. 5 shows an illustrative example of an environment 500 in which a concordance service 504 provides a query result to a user 502 to enable the user to submit a request to a document management service 506 to obtain one or more documents 512 specified in the query result in accordance with at least one embodiment. The concordance service 504 and the document management service 506 may be similar to those described above in connection with FIG. 4.

In the environment 500, a user 502 submits a Bloom filter query 508 to the concordance service 504 to identify one or more documents and concordances that satisfy the query parameters utilized to generate the Bloom filter query 508. In response to receiving the Bloom filter query 508 from the user 502, the concordance service 504 may identify a Bloom filter tree that may be used to process the Bloom filter query 508. As described above, the document management service 506 may generate a Bloom filter tree for each customer or user of the document management service 506 based at least in part on the documents that the user 502 is authorized to access, as well as any query parameters that the user is authorized to query for in the Bloom filter query 508. The document management service 506 may provide these personalized Bloom filter trees to the concordance service 504. Thus, in response to receiving the Bloom filter query 508 from the user 502, the concordance service 504 may use an identifier of the user 502 to identify the Bloom filter tree designated for use in processing queries from the user 502. In some instances, the concordance service 504 may utilize a Bloom filter tree applicable to all users for processing the Bloom filter query 508.

Similar to the concordance service 404 described above in connection with FIG. 4, the concordance service 504 may perform a bitwise AND or a bitwise OR operation using the Bloom filter query 508 and the root node of the Bloom filter tree to determine whether the query parameters used to generate the Bloom filter query 508 are specified within any documents the user 502 is authorized to access. The concordance service 504 may perform a bitwise AND or the bitwise OR operation for the Bloom filter query 508 along the branches of the Bloom filter tree if it is determined that the root node satisfies the Bloom filter query 508. If, in following the branches of the Bloom filter tree, the concordance service 504 determines that a node does not satisfy the Bloom filter query 508, the concordance service 504 may omit any branches stemming from this node, as no other child nodes stemming from this node will satisfy the Bloom filter query 508. The concordance service 504 may continue to follow branches stemming off of nodes that satisfy the Bloom filter query 508 until the concordance service 504 identifies one or more leaves of the Bloom filter tree that satisfy the Bloom filter query 508. These leaves may correspond to individual documents maintained by the document management service 506 or to additional concordances, which may be used by the document management service 506 to identify the documents that satisfy the user's query parameters. Each leaf may specify, in metadata, a document or concordance identifier that may be used by the document management service 506 to retrieve the document or concordance usable to fulfill the query.

The concordance service 504 may provide any document and concordance identifiers obtained through analysis of the Bloom filter tree using the Bloom filter query 508 to the user 502 to fulfill the user's request. In an embodiment, the user 502 submits a second request to the document management service 506 to obtain the documents corresponding to the document identifiers provided by the concordance service 504 and/or to utilize the concordances corresponding to the concordance identifiers provided by the concordance service 504 to identify one or more documents that may satisfy the user's query. The user 502 may provide, in its request to the document management service 506, encrypted query parameters 510 comprising the query parameters used to generate the Bloom filter query 508. These query parameters may be encrypted using a cryptographic key or other shared secret maintained between the user 502 and the document management service 506. Alternatively, the query parameters may be encrypted using a cryptographic key used as input to a cryptographic hash function for generating the Bloom filter query 508. This cryptographic key may be provided by the document management service 506 during a user registration process or as described above in connection with FIG. 4. Generally, the same processes described above in connection with FIG. 4 for using symmetric and asymmetric cryptographic keys may be used for encrypting the query parameters.

In the request, the user 502 may further provide credential information usable by the document management service 506 to authenticate the user 502. The credential information may include, among other things, a username, a corresponding password, biometric information, a cryptographic key, a unique identifier, a set of credentials, a hash of the set of credentials, a digital signature generated using a credential, a message authentication code generated based at least in part on a credential, and the like. In response to the request from the user 502, the document management service 506 may access a customer profile datastore to identify a customer profile corresponding to the user 502 and to obtain information usable to determine whether the credential information provided by the user 502 is valid and corresponds to the user 502. If, using the user's credential information and the user's customer profile, the document management service 506 determines that the user 502 cannot be successfully authenticated, the document management service 506 may deny the user's request.

If the user 502 is successfully authenticated by the document management service 506, the document management service 506 may decrypt the encrypted query parameters 510 to obtain the query parameters used by the user 502 to generate the Bloom filter query 508. Further, the document management service 506 may evaluate the provided document and concordance identifiers to determine whether the user 502 is authorized to access the identified documents and other documents corresponding to the identified concordances. If the user 502 is not authorized to access any of the identified documents and the documents corresponding to the identified concordances, the document management service 506 may deny the user's request to retrieve these documents 512.

The document management service 506 may access each identified document that the user 502 is authorized to access to determine whether each document satisfies the user's provided query parameters. If a document is identified that does not satisfy the provided query parameters, the document management service 506 may determine that the document was selected by the concordance service 504 as a false positive result. Thus, the document management service 506 may notify the user 502 that the document does not satisfy its query parameters. Once the document management service 506 has identified the documents 512 that the user 502 is authorized to access and that satisfy the provided query parameters, the document management service 506 may provide these documents 512 to the user 502. In some embodiments, the document management service 506 may encrypt the documents 512 using a cryptographic key or other shared secret. Thus, the user 502 may utilize its cryptographic key or shared secret to decrypt the documents 512.

Figure 6:
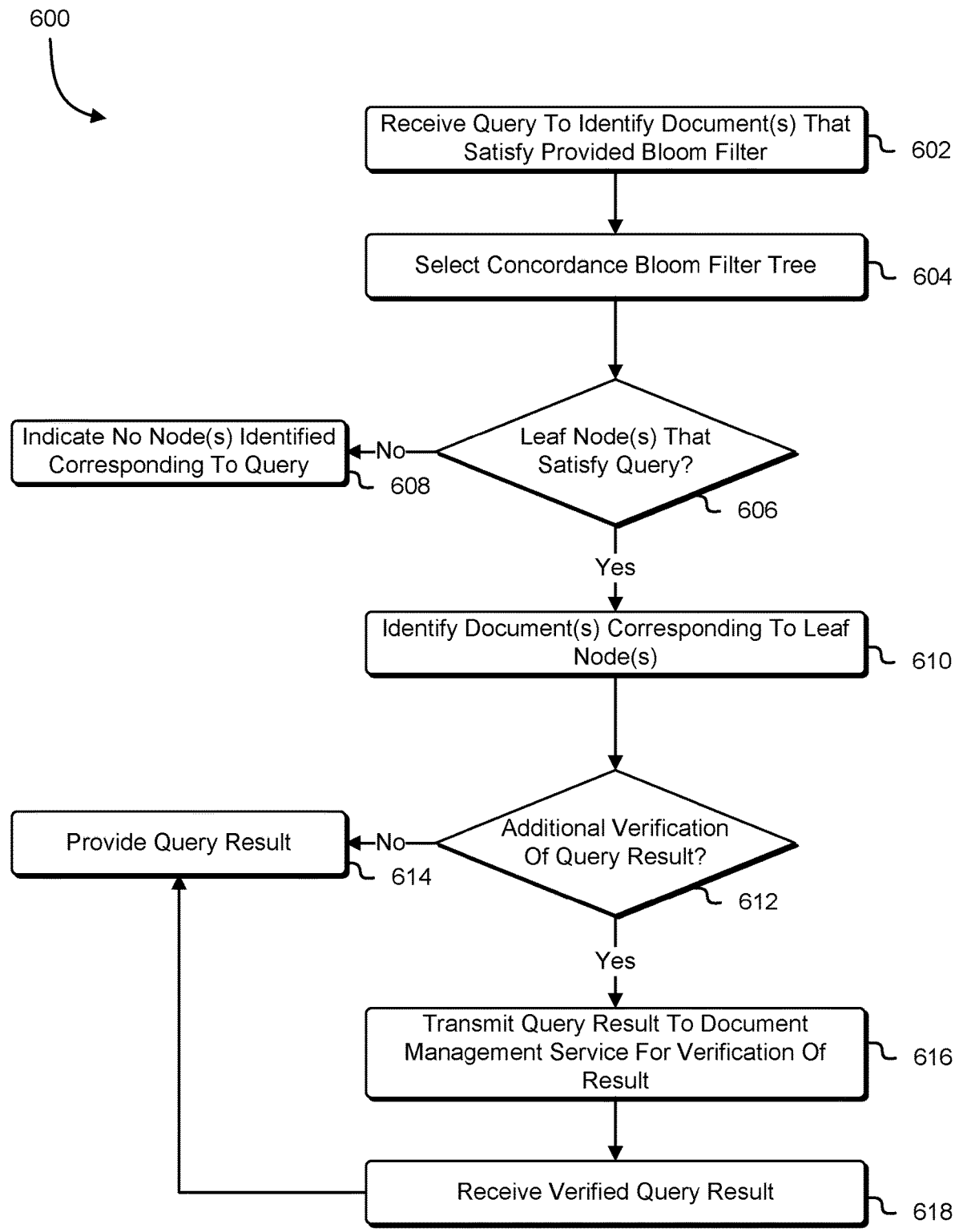
FIG. 6 shows an illustrative example of a process for providing a query result to a user in response to a Bloom filter query from the user to identify one or more documents including elements used to generate the Bloom filter query in accordance with at least one embodiment.

As noted above, the concordance service may obtain a Bloom filter query from a user, which may be used to identify, from a Bloom filter tree, one or more documents and/or additional concordances that satisfy the query parameters used to generate the Bloom filter query. The concordance service may provide document identifiers corresponding to documents that satisfy the query parameters to the user to fulfill the user's request. In some embodiments, the concordance service provides the document identifiers to the document management service, which may verify that the documents corresponding to the document identifiers satisfy the query parameters used to generate the Bloom filter query. Accordingly, FIG. 6 shows an illustrative example of a process 600 for providing a query result to a user in response to a Bloom filter query from the user to identify one or more documents including elements used to generate the Bloom filter query in accordance with at least one embodiment. The process 600 may be performed by the aforementioned concordance service, which may obtain Bloom filter trees from the document management service for use in processing Bloom filter queries from users.

At any time, the concordance service may receive 602 a Bloom filter query that may be used to identify one or more documents that satisfy the Bloom filter query. The Bloom filter query may be generated by a user or other service using one or more query parameters provided by the user. For instance, the user may be provided with the parameters used to generate a Bloom filter query that has a size that is identical to the size of the Bloom filters included in the Bloom filter tree utilized by the concordance service. Further, the user may be provided with the hash functions usable to set the bits within the Bloom filter query from zero to one for each query parameter. In some embodiments, the user is provided with a cryptographic key usable as input to a cryptographic hash function to create encrypted query parameters that may be used to set the bits of the Bloom filter query. Additionally, or alternatively, the user may use the cryptographic key or an identifier of the cryptographic key as a parameter usable to set one or more bits in the Bloom filter query. This may be used by the concordance service to identify any documents that the user is authorized to access.

In response to receiving the Bloom filter query from the user, the concordance service may select 604 a Bloom filter tree that may be used to identify any documents that satisfy the query parameters used to generate the Bloom filter query. For instance, the concordance service may transmit a request to the document management service to identify a Bloom filter tree specific to the user that submitted the Bloom filter query. The user-specific Bloom filter tree may correspond to a subset of documents that the user may be authorized to access. Alternatively, the concordance service may maintain a Bloom filter tree that is applicable to all users. The concordance service may perform one or more set functions (e.g., bitwise OR, bitwise AND) using the Bloom filter query and the Bloom filter at a root node of the Bloom filter tree to determine whether any of the documents indexed using the Bloom filter tree satisfy the query parameters used to generate the Bloom filter query. If so, the concordance service may evaluate the Bloom filter query against the Bloom filters of the children nodes of the root node to determine whether any of these children nodes satisfy the query parameters of the Bloom filter query. If a child node does not satisfy the query parameters of the Bloom filter query, the concordance service may neglect any branches stemming from the child node, as no subsequent nodes will satisfy the query parameters of the Bloom filter query.

Through analysis of the Bloom filter tree, the concordance service may determine 606 whether there are any leaf nodes that satisfy the query parameters of the Bloom filter query. If the concordance service determines that no leaves are identified that satisfy the query, the concordance service may indicate 608 to the user that no nodes correspond to the query. Alternatively, if the concordance service identifies one or more leaf nodes that satisfy the query parameters of the Bloom filter query, the concordance service may identify 610 the one or more documents that correspond to these leaf nodes. For instance, each leaf node may include metadata that may specify a document identifier. This document identifier may correspond to a document maintained by the document management service. In some embodiments, a leaf node can include metadata that specifies an identifier for an additional concordance that is used to index one or more other documents maintained by the document management service. This additional concordance may be used to identify other documents that may satisfy the query parameters of the Bloom filter query.

In some embodiments, the concordance service, instead of or in addition to identifying leaf nodes that satisfy the query parameters of the Bloom filter query, will determine whether there are any intermediate nodes of the Bloom filter tree that satisfy the query parameters of the Bloom filter query. For instance, intermediate nodes of the Bloom filter tree may correspond to categories that may be the subject of the query parameters identified by the user. As an example, a query may be to identify a category of documents where at least one document contains a particular phrase. Thus, to satisfy such a query, a response indicating the category of documents may be provided. This may cause the concordance service to identify the intermediate nodes that satisfy the query parameters of the Bloom filter tree and provide a result that indicates the corresponding categories.

The concordance service may determine 612 whether additional verification of the query results by the document management service is needed prior to providing these results to the user in response to its query. For instance, the document management service may evaluate any documents identified by the concordance service to determine whether these documents actually satisfy the query parameters used to generate the Bloom filter query. Additionally, or alternatively, the document management service may determine whether the user is authorized to access the documents identified by the concordance service. In some embodiments, the concordance service provides the encrypted query parameters provided by the user in its query to the document management service. The document management service may use its cryptographic key to decrypt the encrypted query parameters. The document management service may use these query parameters to determine whether the identified documents satisfy the query parameters provided by the user. In some instances, additional verification may not be required, as the document management service may determine whether the user is authorized to access the documents identified by the concordance service in response to a request from the user to access these documents.

If additional verification of the query results is not required, the concordance service may provide 614 the query result to the user to fulfill its request. The query result may specify the document identifiers corresponding to documents that satisfy the query parameters used to generate the Bloom filter query. This may enable the user to access the document management service and submit a request to obtain these documents. Alternatively, if additional verification of the query results is required, the concordance service may transmit 616 the query result to the document management service for verification. In some instances, the concordance service may provide encrypted query parameters provided by the user for use by the document management service in verifying the query results. The document management service may evaluate each identified document to determine whether the document satisfies the provided query parameters. If a document does not satisfy the query parameters or the user is not authorized to access the document, the document management service may eliminate the document from the query result.

The document management service may provide the verified query result to the concordance service. The concordance service may receive 618 the verified query result and provide 614 this verified query result to the user to fulfill its request. In some instances, the document management service may provide the documents corresponding to the verified query result to the concordance service or directly to the user. The documents may be encrypted using a cryptographic key or shared secret established between the document management service and the user. This may prevent the concordance service from being able to evaluate the documents and discern their contents. If the documents are provided to the concordance service by the document management service, the concordance service may provide these documents to the user to fulfill the request.

Figure 7:
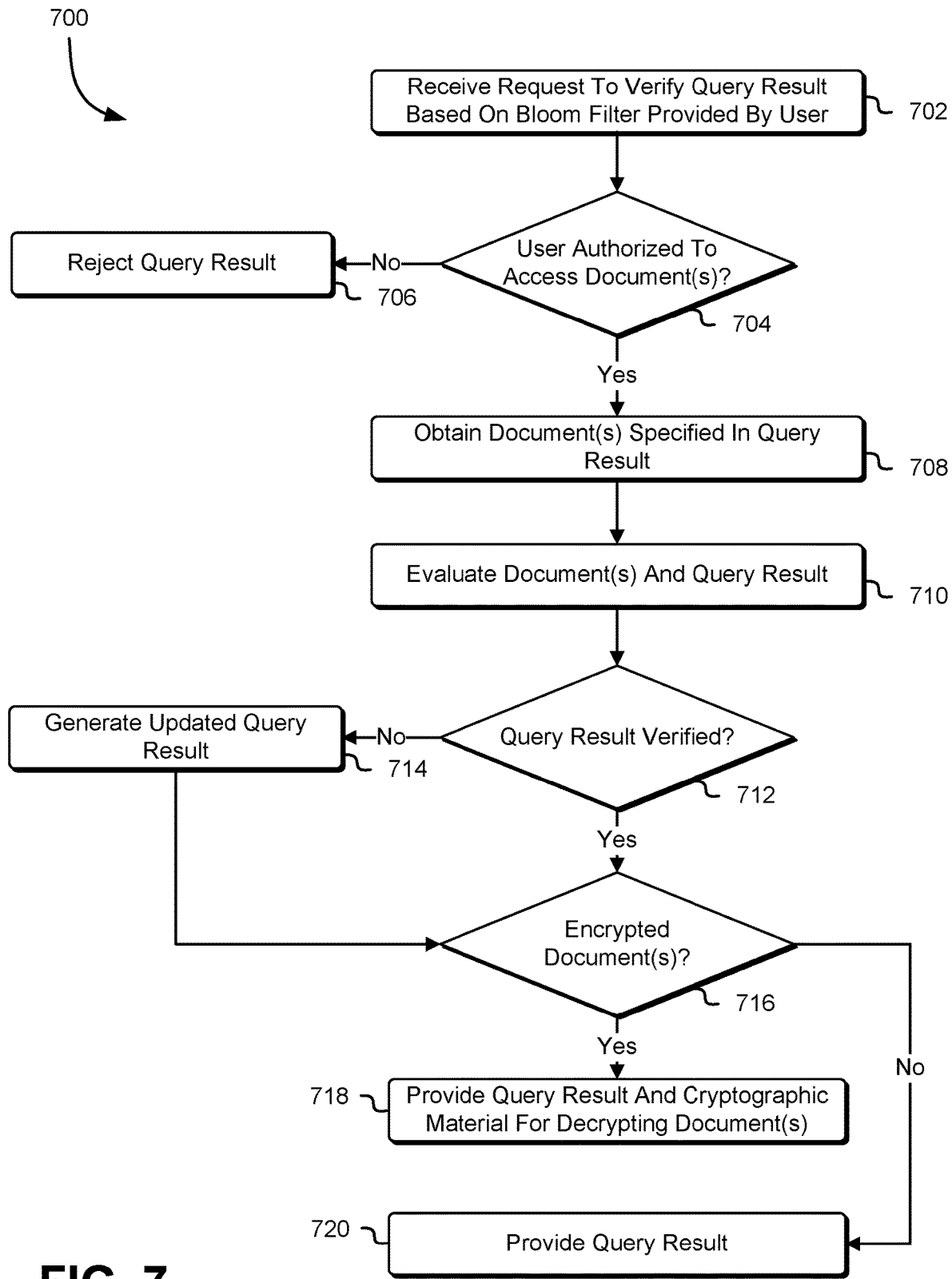
FIG. 7 shows an illustrative example of a process for verifying a query result generated by a concordance service in response to a Bloom filter query in accordance with at least one embodiment.

As noted above, the document management service may evaluate a query result from a concordance service to determine whether the documents identified in the query result satisfy the user's query parameters. Further, the document management service may determine whether the user is authorized to access the identified documents. The document management service may update the query result if the user is not authorized to access an identified document and/or if an identified document does not satisfy the query parameters of the user's Bloom filter query. The document management service may provide the updated query result to the concordance service, which may provide the updated query result to the user. In some embodiments, the document management service can provide cryptographic material to the user that may be used to decrypt any encrypted documents maintained by the document management service. Accordingly, FIG. 7 shows an illustrative example of a process 700 for verifying a query result generated by a concordance service in response to a Bloom filter query in accordance with at least one embodiment. The process 700 may be performed by the aforementioned document management service or any other service that may evaluate query results, generated by the concordance service, on behalf of the document management service.

The document management service may receive 702 a request to verify a query result generated based at least in part on a Bloom filter query provided by a user and a Bloom filter tree utilized as a concordance for documents maintained by the document management service. The query result may specify one or more document identifiers corresponding to particular documents maintained by the document management service. As described above, each leaf of the Bloom filter tree may correspond to a particular document and may specify, in metadata, an identifier for the document. Thus, the concordance service may obtain a document identifier if the corresponding leaf satisfies the Bloom filter query. The concordance service may specify, in the query result, an identifier for the user that submitted the Bloom filter query. This identifier may be used by the document management service to identify a customer profile for the user, which may be used to determine 704 whether the user is authorized to access any of the documents identified in the query result. If the user is not authorized to access any of the documents identified in the query result, the document management service may reject 706 the query result and transmit a notification to the concordance service to indicate that the user is not authorized to access these documents.

If the user is authorized to access any of the documents identified in the query result, the document management service may obtain 708 the one or more documents specified in the query result that the user is authorized to access. For instance, the document management service may access the one or more datastores used to store the identified documents to access the documents. The document management service may evaluate 710 these one or more documents to determine whether these documents satisfy the query parameters provided by the user and utilized to generate the Bloom filter query. If the document management service determines that a document does not satisfy the query parameters specified by the user, the document management service may determine that the document was identified as a result of a false positive result and may disregard the document. Alternatively, if the document management service determines that a document satisfies the query parameters specified by the user, the document management service may consider the document to have been verified as satisfying the user's query parameters.

Through evaluation of the documents identified in the query result and the query parameters provided by the user, the document management service may determine 712 whether the query result has been verified. If the query result has not been verified (e.g., at least one document identified in the query result does not satisfy the query parameters), the document management service may generate 714 an updated query result that specifies document identifiers corresponding to documents that satisfy the user's query parameters. Alternatively, if the query result has been verified by the document management service, the document management service may leave the query result intact without making any modifications.

The document management service may further determine 716 whether any of the verified documents are encrypted using one or more cryptographic keys or other cryptographic material. For instance, the document management service may encrypt documents that require additional safeguards against unintentional dissemination to entities not authorized to access the contents of these documents. If any of the documents identified in the query result are encrypted, the document management service may obtain the cryptographic material usable to decrypt the encrypted documents. The cryptographic material may include an identifier for a cryptographic key, the cryptographic key itself, or other material that may be used to derive the cryptographic key. The document management service may provide 718 the verified query result and the cryptographic material for decrypting any encrypted documents to the concordance service. This may cause the concordance service to provide the verified query result and the cryptographic material to the user to fulfill its request. If none of the documents verified by the document management service as satisfying the query results are encrypted, the document management service may provide 720 the query result to the concordance service. The verified query result may specify a subset of the set of documents identified by the concordance service. For instance, the verified query result may omit false positive results or any documents that the user is not authorized to access. In some instances, the subset of the set of documents may include the entire set of documents if there are no false positives and the user is authorized to access all documents of the set.

It should be noted that the process 700 may be performed with additional and/or alternative operations. For instance, rather than providing the verified query result to the concordance service, the document management service may provide the one or more documents that satisfy the query parameters of the user and that the user is authorized to access. These documents may be provided directly to the user or to the concordance service, which may provide these documents to the user to fulfill the user's request. In some embodiments, the document management service encrypts the identified documents and provides the encrypted documents to the user or to the concordance service. Thus, the user may need to use a cryptographic key supplied by the document management service to decrypt the encrypted documents.

Figure 8:
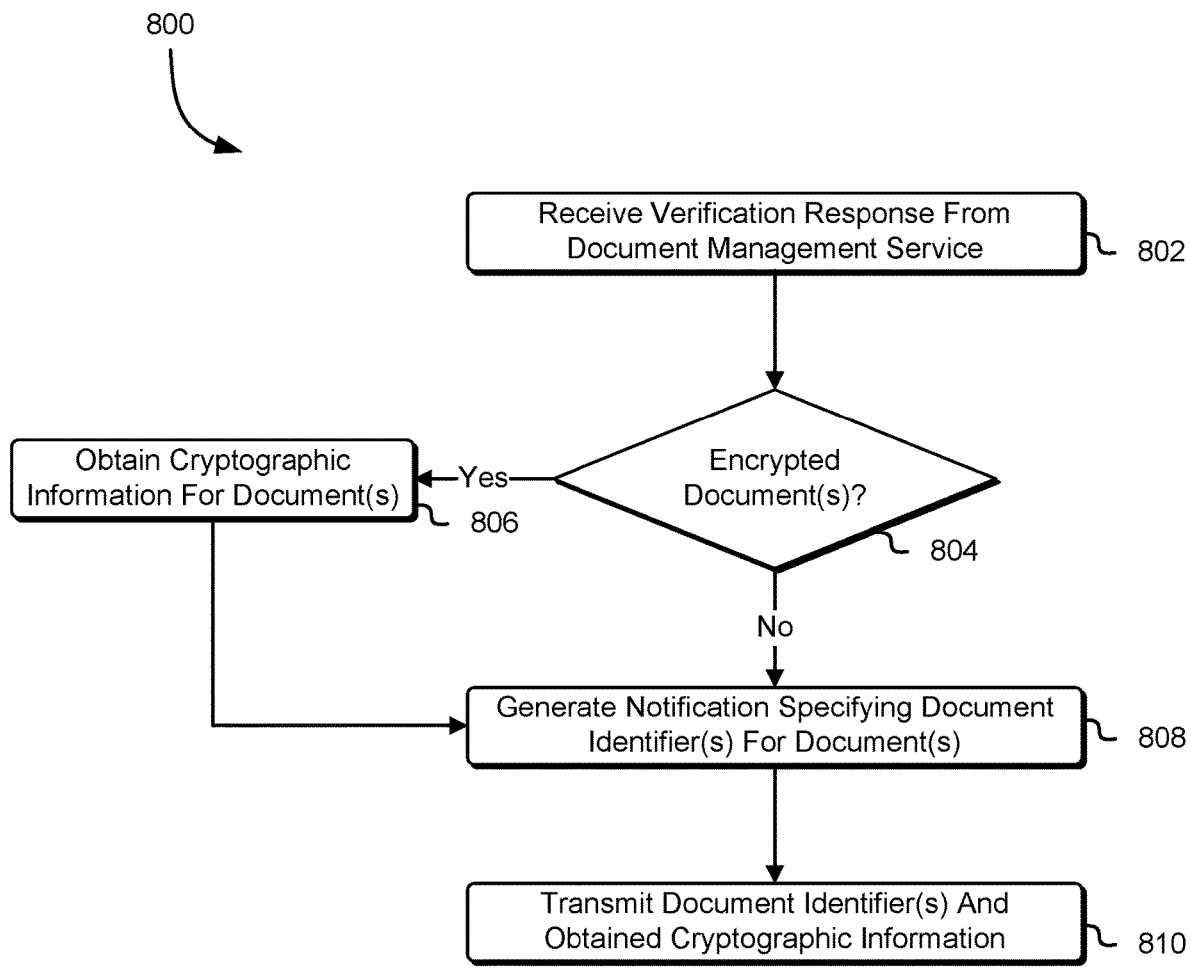
FIG. 8 shows an illustrative example of a process for providing document identifiers and cryptographic information to a user in response to receiving an indication from a document management service that query results have been verified in accordance with at least one embodiment.

As noted above, the concordance service, in response to receiving a verification response from the document management service regarding documents that satisfy the query parameters used to generate the Bloom filter query, may transmit a notification to the user specifying one or more document identifiers corresponding to documents that satisfy the user's query parameters. Accordingly, FIG. 8 shows an illustrative example of a process 800 for providing document identifiers and cryptographic information to a user in response to receiving an indication from a document management service that query results have been verified in accordance with at least one embodiment. The process 800 may be performed by the aforementioned concordance service, which may communicate with the document management service to obtain verified query results and with the user to provide the verified query results, as well as any cryptographic information usable to decrypt any encrypted documents provided by the document management service.

In response to a request to verify a query result generated through evaluation of a Bloom filter tree and the Bloom filter query provided by the user, the concordance service may receive 802 a verification response from the document management service. The verification response may specify one or more document identifiers corresponding to documents that satisfy the user's query parameters. The verification response may also specify whether one or more documents identified by the document management service are encrypted. Thus, the concordance service may evaluate the verification response to determine 804 whether any of the identified documents have been encrypted by the document management service. For instance, the document management service may encrypt one or more documents to ensure that the contents of these documents are not exposed to unauthorized entities, such as the concordance service or other users.

If the verification response identifies one or more encrypted documents that satisfy the user's query parameters, the concordance service may obtain 806 cryptographic information usable to decrypt these one or more encrypted documents. For instance, the verification response may include the cryptographic information, which the user may use to derive or obtain the cryptographic materials for decryption of the encrypted documents. The cryptographic information may include an identifier for a cryptographic key, materials usable to generate the cryptographic key, or the cryptographic key itself.

The concordance service may generate 808 a notification specifying the document identifiers corresponding to the documents that satisfy the user's query parameters. The notification may identify any documents that are encrypted by the document management service, as well as information usable by the user to access the document management service to obtain these documents. The concordance service may transmit 810 the notification specifying the document identifiers corresponding to the documents identified by the document management service, as well as any obtained cryptographic information usable to derive the cryptographic material for decrypting any encrypted documents. In some embodiments, the concordance service identifies some of the documents in response to the user's query. For instance, if the verification result from the document management service specifies a significant number of document identifiers, the concordance may present the user with a subset of these document identifiers via a graphical user interface. Thus, in order for the user to access additional document identifiers specified in the verification result, the user may use the graphical user interface to update the information presented on the interface to include the additional document identifiers.

Figure 9:
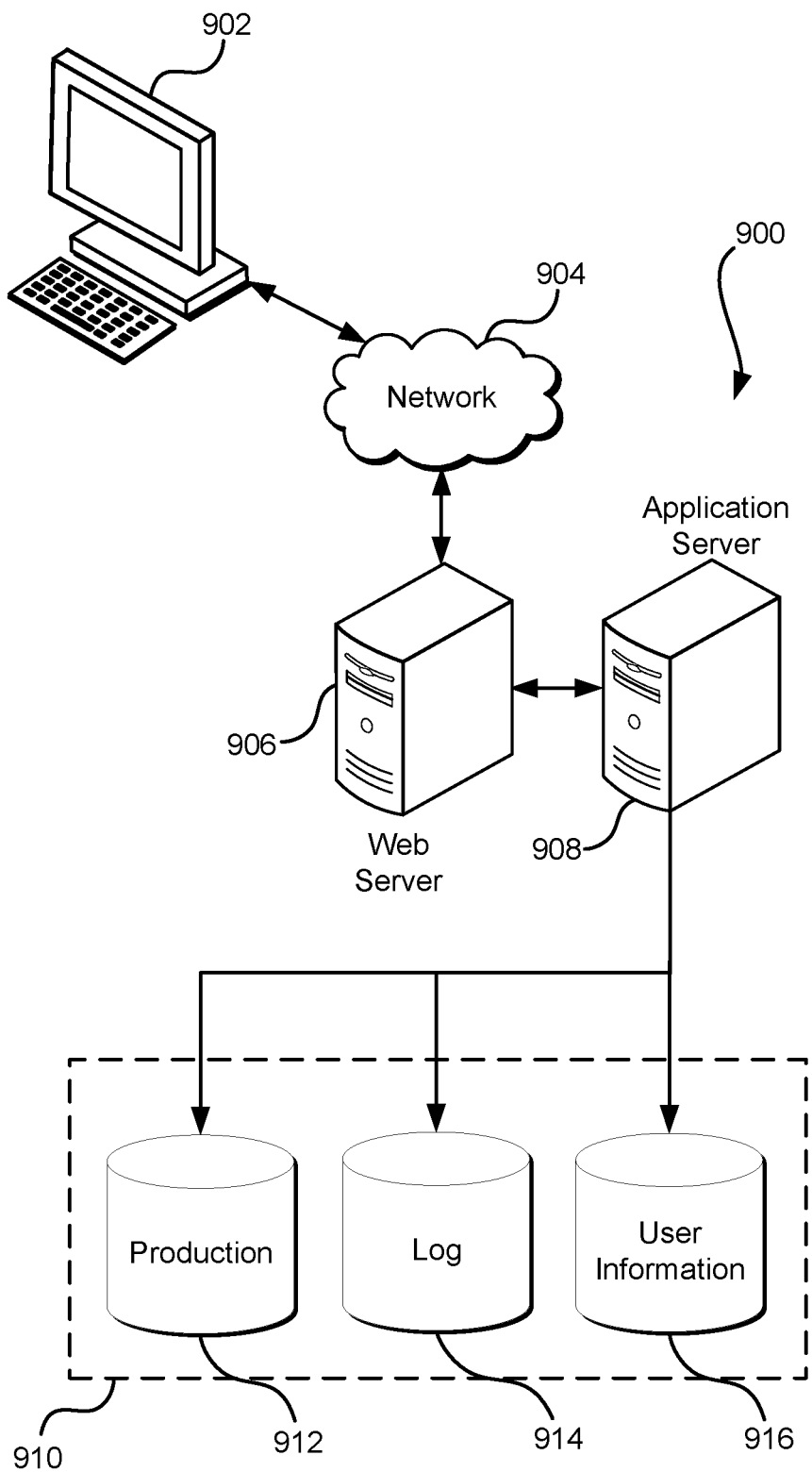
FIG. 9 shows an illustrative example of an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    one or more processors; and
    memory comprising computer-executable instructions that, as a result of being executed by the one or more processors, cause the system to:
    obtain a request that indicates a probabilistic data structure generated based at least in part on a set of query parameters, wherein the probabilistic data structure is generated such that a search of the probabilistic data structure has a non-zero probability of returning a false positive, the probabilistic data structure further including a subset of bits corresponding to a cryptographic key identifier for a cryptographic key usable to decrypt at least some of a set of encrypted resources;
    utilize the probabilistic data structure and a probabilistic data structure tree comprising nodes individually corresponding to respective subsets of the set of encrypted resources to determine a set of nodes that individually satisfy the set of query parameters;
    determine a subset of resources corresponding to the set of nodes, thereby resulting in a determined subset, at least some of the resources of the determined subset being encrypted using the cryptographic key;
    verify that resources in the determined subset satisfy the set of query parameters; and
    provide a response to the request that is generated based at least in part on the determined subset.

2. The system of claim 1, wherein the instructions further cause the system to:
    transmit a second request to a service to verify that the resources in the determined subset satisfy the set of query parameters; and
    obtain a response from the service that indicates a subset of the resources satisfy the set of query parameters.

3. The system of claim 2, wherein:
    the request includes an encrypted notification that specifies the set of query parameters; and
    the instructions further cause the system to provide, in the second request, the encrypted notification to enable the service to obtain the set of query parameters for verifying that the resources in the determined subset satisfy the set of query parameters.

4. The system of claim 1, wherein the response to the request includes the resources in the determined subset that have been verified as satisfying the set of query parameters.

5. The system of claim 4, wherein the resources included in the response to the request are encrypted using the cryptographic key provided to a requestor that submitted the request.

6. The system of claim 1, wherein the determined subset is determined based at least in part on a set of leaf nodes of the probabilistic data structure tree that correspond to the subset of resources.

7. The system of claim 1, wherein the probabilistic data structure is a Bloom filter comprising a plurality of bits used to denote presence of the set of query parameters.

8. A non-transitory computer-readable storage medium comprising executable instructions that, as a result of being executed by one or more processors of a computer system, cause the computer system to at least:
    obtain a probabilistic data structure generated based at least in part on a set of query parameters, wherein the probabilistic data structure is generated such that a search of the probabilistic data structure has a non-zero probability of returning a false positive, the probabilistic data structure further including a subset of bits corresponding to a cryptographic key identifier for a cryptographic key usable to decrypt at least some of a set of encrypted resources;
    process the probabilistic data structure using a probabilistic data structure tree comprising nodes individually corresponding to respective subsets of the set of encrypted resources to determine a set of nodes that individually satisfy the set of query parameters;
    determine a subset of resources that correspond to the set of nodes, at least some of the subset of resources being encrypted using the cryptographic key;
    verify that resources in the subset of resources satisfy the set of query parameters; and
    provide a response that is generated based at least in part on the subset of resources.

9. The non-transitory computer-readable storage medium of claim 8, wherein the instructions further cause the computer system to:
    transmit a request to a service that maintains the set of resources to verify that the resources in the subset of resources satisfy the set of query parameters; and
    obtain, from the service, the response.

10. The non-transitory computer-readable storage medium of claim 9, wherein the instructions further cause the computer system to:
    obtain, in addition to the probabilistic data structure, an encrypted notification that includes the set of query parameters, the encrypted notification generated using the cryptographic key; and
    provide, in the request to the service, the encrypted notification to cause the service to obtain the set of query parameters for verifying that the resources in the subset of resources satisfy the set of query parameters.

11. The non-transitory computer-readable storage medium of claim 9, wherein the response from the service includes at least some of the subset of resources, wherein at least some of the subset of resources are verified as satisfying the query parameters.

12. The non-transitory computer-readable storage medium of claim 11, wherein:
    at least some of the subset of resources are encrypted; and
    the response includes cryptographic material usable to derive the cryptographic key for decrypting the at least some of the subset of resources.

13. The non-transitory computer-readable storage medium of claim 8, wherein the probabilistic data structure tree is selected based at least in part on an identifier associated with a requestor that provided the probabilistic data structure.

14. The non-transitory computer-readable storage medium of claim 8, wherein the probabilistic data structure is further generated using the set of query parameters and the cryptographic key as input to a cryptographic hash function to identify a subset of bits to be set within the probabilistic data structure tree, whereby the nodes individually comprise a Bloom filter for the respective subsets of the set of resources.

15. A computer-implemented method, comprising:
    obtaining a probabilistic data structure that encodes a set of query parameters, wherein the probabilistic data structure is generated such that a search of the probabilistic data structure has a non-zero probability of returning a false positive, the probabilistic data structure further including a subset of bits corresponding to a cryptographic key identifier for a cryptographic key usable to decrypt at least some of a set of encrypted resources of a plurality of resources;
    determining from the probabilistic data structure, using a probabilistic data structure tree comprising nodes individually corresponding to respective subsets of the set of encrypted resources, a set of nodes that individually satisfy the set of query parameters;
    determining a subset of resources that corresponds to the set of nodes, at least some of the subset of resources being encrypted using the cryptographic key;
    verify that resources in the determined subset satisfy the set of query parameters; and
    provides a response to the request that is generated based at least in part of the determined subset.

16. The computer-implemented method of claim 15, wherein:
    the search comprises an identifier associated with a requestor; and
    the probabilistic data structure tree is selected based at least in part on the identifier.

17. The computer-implemented method of claim 15, wherein:
    the search comprises an encrypted notification that specifies the set of query parameters; and
    the method comprises transmitting the encrypted notification to a service to enable the service to decrypt the encrypted notification and use the set of query parameters to verify that the subset of resources satisfy the set of query parameters.

18. The computer-implemented method of claim 17, wherein:
    a response from the service comprises that a second subset of the subset of resources is encrypted using the cryptographic key; and
    the response from the service comprises cryptographic material usable to derive the cryptographic key.

* * * * *